May 6, 1969 J. LOPACKI 3,442,014

METHOD OF STABILIZING RESISTANCE IN SEMICONDUCTOR MANUFACTURE

Filed March 4, 1966

INVENTOR.
JOHN LOPACKI
BY
K. W. Brownell
ATTORNEY

United States Patent Office 3,442,014

Patented May 6, 1969

3,442,014

METHOD OF STABILIZING RESISTANCE IN SEMICONDUCTOR MANUFACTURE

John Lopacki, North Tonawanda, N.Y., assignor to The Carborundum Company, Niagara Falls, N.Y., a corporation of Delaware Filed Mar. 4, 1966, Ser. No. 531,981

Int. Cl. H01c 7/04

U.S. Cl. 29—612 5 Claims

ABSTRACT OF THE DISCLOSURE

This invention relates to a method of stabilizing the resistance of a semiconductor assembly comprising a semiconductor body of silicon carbide having metallic leads fused directly thereto by a bond including the carbide and silicide of the metal of the leads. The method comprises heating the semiconductor assembly in an oxidizing atmosphere at a temperature above the oxidizing temperature of the metallic carbide and silicide in the bond, but below the oxidation temperature of the semiconductor body for a time which is long enough to oxidize the metallic carbide and silicide to an extent sufficient to increase the resistance of the assembly to a value within the desired range of values.

Figure 1:
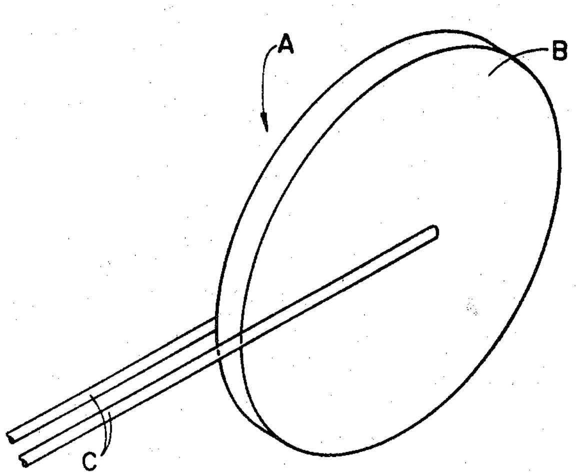

This invention relates to improvements in semiconductor manufacture, and more particularly to a new and improved method of stabilizing the resistance of a semiconductor assembly and to a new and improved semiconductor assembly resulting from such method.

A recurrent problem in semiconductor manufacture has been shelf life aging, wherein the resistances of such devices change because of oxidation. Thus, a device which may have the desired resistance when manufactured, will not have this same resistance when removed from stock, thereby requiring further testing of individual devices in order to meet customer specifications. This problem, coupled with the difficulty of reproducing semiconductor devices in quantity to close resistance tolerances, unnecessarily increases the overall selling costs of such devices.

Accordingly, a primary object of the present invention is to overcome these problems by stabilizing the resistance of a semiconductor assembly comprising a semiconductor body of silicon carbide having metallic leads fused directly thereto by a bond including the carbide and silicide of the metallic leads, thereby enabling reproduction of such assemblies to close resistance tolerances and maintenance of the desired resistance indefinitely. While not so limited, the present invention is particularly adapted to stabilizing the resistance of a thermistor assembly wherein the semiconductor body is a single crystal of silicon carbide.

A thermistor, as the term is employed herein, is an electrical resistance body having a high sensitivity to changes in temperature over a wide temperature range. Thus, its electrical resistance is sensitive to change with changes in temperature. Thermistors which decrease in resistivity with increase in temperature are said to have a negative temperature coefficient of resistivity, as do the single crystals of silicon carbide referred to herein.

This primary object is accomplished, while maintaining the desired electrical characteristics of the semiconductor body by heating the semiconductor assembly in an oxdizing atmosphere at a reaction temperature above the oxidizing temperature of the metallic carbide and silicide in the bond between the leads and semiconductor body but below the oxidation temprature of the semiconductor body for a reaction time which is very short but long enough to oxidize the metallic carbide and silicide to an extent sufficient to increase the resistance of the assembly to a value within the desired range of values Such heating may be performed before, after, or both before and after encapsulating the body and the portions of the leads fused thereto with a bead, depending upon the material of the bead. The present invention has been employed to produce thermistor assemblies having a resistance reproducible within plus of minus 2 percent at 25° C. and which resistance has remained stable indefinitely.

Figure 2:
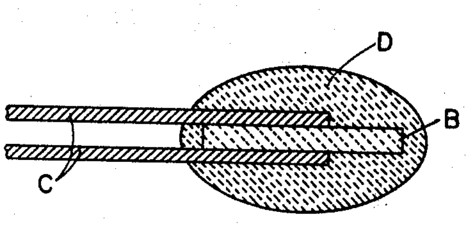

Other objects and advantages of the invention will become apparent upon consideration of the following detailed description and accompanying drawings wherein:

FIG. 1 is a greatly enlarged perspective view of a thermistor assembly prior to encapsulation, and FIG. 2 is a greatly enlarged sectional view of such assembly after encapsulation.

Referring to the drawings, and particularly FIG. 1, the thermistor assembly is generally indicated at A. This device is composed of a semiconductor body, namely a single crystal of boron doped silicon carbide in the preferred form of a circular disc B having a diameter of .05 inch and a thickness of .01 inch. Welded or fused (these terms being used interchangeably herein) longitudinally across the centers of the opposite major faces of disc B are a pair of metallic, preferably tungsten, leads or wires C, each having a diameter of .005 inch and a length of .5 inch. Later on, as shown in FIG. 2, disc B and the portions of leads C fused thereto are encapsulated with a bead D of suitable material such as resin (not shown) or ceramic (shown), for oxidation resistance and increased strength.

The leads C may be welded or fused directly to disc B in any suitable manner, but preferably by passing an electric current pulse through the assembly until such pulse reaches a predetermined value, all as described in detail in the copending application of Edwin F. Ziemendorf and John R. Lampus, Serial No. 347,862, filed February 27, 1964, now Patent 3,368,058. As a consequence, leads C are fused directly to disc B by a bond including the carbide and silicide of the metallic leads, viz, tungsten carbide and tungsten silicide.

In practicing the present invention, assembly A is heated in an oxidizing atmosphere at a reaction temperature range from about 750 to about 1000° C., which is above the oxidation temperature of the metallic carbide and silicide of the bond between leads C and disc B but below that of the silicon carbide disc, for a reaction time ranging from about 1 to about 25 seconds, generally the higher the temperature the shorter the time. This heating may involve a single step or a series of steps within the overall time period, depending upon how far below the desired resistance value the actual resistance of assembly A is, the particular temperature employed, and whether the assembly is encapsulated or not. Likewise, this heating may take place in an oxidizing flame or muffle furnace or by passing an electric current pulse through assembly A, and may occur before, after or both before and after encapsulation, depending upon the material of the bead.

For example, when employing a resinous bead, the heating is completed to bring the room temperature resistance value up to that desired within the range of tolerance, viz, 2600 ohms±2 percent at 25° C., prior to encapsulation. Otherwise, the bead would be destroyed by such further heating. On the other hand, when employing a ceramic bead, which is normally required for operation of assembly A below −100° C. (−148° F.) or above 200° C. (392° F.), the heating may be performed both before and after encapsulation. Thus, the actual resistance of assembly A can be adjusted roughly by heating before encapsulation to a predetermined range of values below that desired, followed by finely adjusting such resistance value to that desired within preset tolerances, viz, 2600 ohms±2 percent at 25° C., after encapsulation. The heating after encapsulation has the beneficial effect of rendering the ceramic encapsulant more impervious, and hence stronger and more oxidation resistant. Alternatively, this heating can be performed in the first instance following encapsulation with the ceramic bead to produce the desired results.

In order to highlight the invention without limiting its scope, the following illustrative examples are given.

EXAMPLE 1

A series of 6 thermistor assemblies A provided with tungsten wires C, were suitably encapsulated with ceramic beads D by enveloping the discs B and the portions of leads C fused thereto in glassy frit and firing at 700–750° to vitrify the beads. These assemblies, which had resistance values ranging from 1990 to 2480 ohms at 25° C., were heated by insertion into an oxidizing muffle furnace at a temperature of 925° C. (just beyond the softening point of bead D) for periods of 1 to 5 seconds and for a total time ranging from 5 to 22 seconds for a particular assembly, until the desired resistance value was reached. The object of the heating was to produce a resistance at 25° C. of 2600 ohms±2 percent, and the following results were obtained.

TABLE I

| Assembly Number | Resistance in Ohms at 25° C. Before Heating | After Heating | Total Time in Seconds at 925° C. |
|---|---|---|---|
| 1 | 2,045 | 2,605 | 15 |
| 2 | 2,150 | 2,565 | 15 |
| 3 | 2,480 | 2,550 | 5 |
| 4 | 1,990 | 2,580 | 22 |
| 5 | 2,200 | 2,640 | 17 |
| 6 | 2,290 | 2,610 | 14 |

Inasmuch as the limits of tolerance were 2652 ohms and 2548 ohms, it is evident from Table I that the resistances of all of the assemblies fell within these limits. Moreover, the ceramic bead D was rendered more impervious, and therefore stronger and more oxidation resistant.

EXAMPLE 2

A series of 6 thermistor assemblies A having tungsten wires C and resistance values as welded, ranging from 1300 to 1500 ohms at 25° C., were heated as in Example 1 for a total time ranging from 3 to 9 seconds for a particular assembly, with the following results.

TABLE II

| Assembly | (a) | (b) | (c) | (d) | (e) | (f) |
|---|---|---|---|---|---|---|
| Resistance at 25° C. in ohms, as welded | 1,500 | 1,460 | 1,370 | 1,440 | 1,420 | 1,300 |
| Resistance at 25° C. in ohms, after heating | 1,900 | 2,350 | 2,050 | 2,000 | 2,360 | 2,050 |

The purpose of this heating prior to encapsulation was to roughly increase the resistance of the assemblies to the approximate range of 1900–2300 ohms at 25° C. prior to encapsulation. Next, the assemblies were encapsulated with ceramic beads D and reheated, where necessary, as in Example 1, to produce assemblies having the desired resistance of 2600 ohms±2 percent at 25° C.

As a result of practicing the present invention, the following conclusions can be drawn for optimum yields. First, assemblies A should be welded or fused so as to fall within the range of 1900–2100 ohms at 25° C. prior to encapsulating with ceramic beads D. During firing of beads D, there is an increase in resistance of the assemblies of approximately 150 to 300 ohms, bringing the resistance to about 2100–2400 ohms at 25° C. Assemblies in this range require a very short time to bring them into the 2600±2 percent ohm range at 25° C., the total elapsed time during heating being between about 4 and 8 seconds.

For those assemblies having a low, as welded resistance ranging from 500 to 1500 ohms at 25° C., these should be heated into the 1900–2300 ohm range prior to encapsulation with the ceramic beads. Otherwise, a longer period, ranging from about 15 to about 25 seconds is required to bring these assemblies into the desired range of 2548–2648 ohms.

I claim:

1. A method of stabilizing the resistance of a semiconductor assembly comprising a semiconductor body of silicon carbide having tungsten leads fused directly thereto by a bond including the carbide and silicide of tungsten, while maintaining the desired electrical characteristics of said body, said method including heating said assembly in an oxidizing atmosphere at a temperature of from about 750° C. to about 1000° C. for from about 1 second to about 25 seconds to oxidize said tungsten carbide and silicide.

2. The method of claim 1 wherein said heating is followed by encapsulating said body and the portions of said leads fused thereto with a bead.

3. The method of claim 1 wherein said heating is preceded by encapsulating said body and the portions of said leads fused thereto with a ceramic bead.

4. The method of claim 1 wherein said heating is followed by encapsulating said body and the portions of said leads fused thereto with a ceramic bead, and then said heating is repeated to further increase the resistance of said assembly to 2600 ohms plus or minus 2 percent at 25° C.

5. The method of claim 1 wherein said assembly is a thermistor assembly, and said body is a single crystal of silicon carbide.

References Cited

UNITED STATES PATENTS

| | | | |
|---|---|---|---|
| 2,664,486 | 12/1953 | Colpitts | 338—22 X |
| 2,786,819 | 3/1957 | Smith et al. | 338—22 X |
| 2,976,505 | 3/1961 | Lehikawa | 338—22 |
| 2,462,162 | 2/1949 | Christensen et al. | 338—22 |
| 3,205,465 | 9/1965 | Lambertson et al. | 338—22 |

REUBEN EPSTEIN, *Primary Examiner.*

U.S. Cl. X.R.

338—22